US012279347B2

(12) United States Patent
Jordan et al.

(10) Patent No.: US 12,279,347 B2
(45) Date of Patent: Apr. 15, 2025

(54) COLOR COMPENSATION FOR OPTICAL MODIFICATION

(71) Applicant: Electronic Theatre Controls, Inc., Middleton, WI (US)

(72) Inventors: Joshua Jordan, Madison, WI (US); Michael Webb, Dodgeville, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 244 days.

(21) Appl. No.: 18/058,368

(22) Filed: Nov. 23, 2022

(65) Prior Publication Data

US 2024/0167644 A1 May 23, 2024

(51) Int. Cl.
*H05B 45/20* (2020.01)
*F21V 14/06* (2006.01)
*F21Y 115/10* (2016.01)

(52) U.S. Cl.
CPC ............ *H05B 45/20* (2020.01); *F21V 14/06* (2013.01); *F21Y 2115/10* (2016.08)

(58) Field of Classification Search
CPC ..... H05B 45/20; F21V 14/06; F21V 23/0442; F21Y 2115/10; F21Y 2113/13; F21W 2131/406
See application file for complete search history.

(56) References Cited

U.S. PATENT DOCUMENTS 6,488,390 B1 12/2002 Lebens et al.
7,135,664 B2 11/2006 Vornsand et al.
7,626,345 B2 12/2009 Young
7,972,001 B2 7/2011 Penn et al.
8,363,001 B2 1/2013 Tanizoe et al.
8,436,556 B2 5/2013 Eisele et al.
(Continued)

FOREIGN PATENT DOCUMENTS

CN 112261759 A 1/2021
EP 1955430 B1 * 5/2012 ............ G01D 5/145
(Continued)

OTHER PUBLICATIONS

EP-1955430-B1; May 23, 2012; Hornberger J (Year: 2012).*
United Kingdom Intellectual Property Office Action for Application No. 2315778.7 dated Apr. 5, 2024 (4 pages).

*Primary Examiner* — Zheng Song
*Assistant Examiner* — Glenn D Zimmerman
(74) *Attorney, Agent, or Firm* — Michael Best & Friedrich LLP

(57) ABSTRACT

A light fixture includes an array of light-emitting diode ("LED") light sources, a driver circuit that drives the array of LED light sources, and a controller. Controlling the light fixture includes receiving a first output color spectrum for the array of LED light sources that corresponds to a fixture color output spectrum, performing an optical modification of the fixture output color spectrum, determining, based on the optical modification, a compensation value to modify the first output color spectrum to a second output color spectrum that compensates for changes to the fixture output color spectrum resulting from the optical modification, generating, based on the compensation value, a first control signal to drive the array of LED light sources at the second output color spectrum, and controlling the driver circuit using the first control signal.

22 Claims, 7 Drawing Sheets

(56) References Cited

U.S. PATENT DOCUMENTS

| | | | |
|---|---|---|---|
| 8,946,998 B2 | 2/2015 | Edwards et al. | |
| 9,335,210 B2 | 5/2016 | Li et al. | |
| 9,659,513 B2 | 5/2017 | Scheibe | |
| 9,743,483 B2 | 8/2017 | Li et al. | |
| 10,098,197 B2 | 10/2018 | Van De et al. | |
| 10,143,058 B2 | 11/2018 | Demayo et al. | |
| 10,184,641 B2 | 1/2019 | Wang et al. | |
| 10,295,135 B2 | 5/2019 | Gammer et al. | |
| 10,667,360 B2 | 5/2020 | Demayo et al. | |
| 10,772,173 B1 * | 9/2020 | Bewick | H05B 47/18 |
| 10,969,073 B2 | 4/2021 | Jiang | |
| 2006/0226956 A1 | 10/2006 | Young et al. | |
| 2011/0261568 A1 * | 10/2011 | Dalsgaard | F21V 21/30<br>362/249.03 |
| 2018/0020522 A1 | 1/2018 | Rogers, III | |
| 2018/0234001 A1 * | 8/2018 | Dalsgaard | F21S 10/007 |
| 2020/0232625 A1 | 7/2020 | Jurik et al. | |
| 2020/0232626 A1 | 7/2020 | Jurik et al. | |
| 2020/0236759 A1 | 7/2020 | Jurik et al. | |
| 2020/0314974 A1 * | 10/2020 | Thurk | H05B 45/3577 |
| 2021/0356095 A1 * | 11/2021 | Gadegaard | G02B 5/23 |
| 2022/0228727 A1 | 7/2022 | Jurik et al. | |
| 2022/0349554 A1 | 11/2022 | Galstian et al. | |
| 2023/0292420 A1 * | 9/2023 | Jensen | H05B 47/105 |

FOREIGN PATENT DOCUMENTS

| | | | |
|---|---|---|---|
| EP | 4180711 | A1 | 5/2023 |
| WO | 2008127050 | A1 | 10/2008 |

* cited by examiner

COLOR COMPENSATION FOR OPTICAL MODIFICATION

FIELD

Embodiments described herein relate to controlling an output of a light fixture.

BACKGROUND

The lens assembly (e.g., lenses, diffusers, filters, or other optical components) of a light fixture allows the light fixture to manipulate light emitted from light sources (e.g., light-emitting diodes or LEDs) within the light fixtures. Advanced lighting systems include light fixtures capable of performing optical modifications to the light emitted from the LEDs via the lens assembly. LEDs are capable of emitting white light or colored light, commonly referred to as the visible light spectrum. The visible light spectrum typically includes wavelengths of light between 380 to 700 nanometers. Optical modification of the visible light spectrum is typically accomplished by bending or changing the direction of the light emitted from light sources using a lens assembly.

SUMMARY

Optical modifications are convenient for manipulating emitted light, but can cause the spectrum of the emitted light to shift. Different wavelengths of light within the visible light spectrum can be shifted by the optical modifications at different rates. This can be the result of the location of each LED relative to the lens assembly being different. As an optical modification occurs, a direction that rays of the emitted light are deflected when exiting the lens assembly can also change. This can result in a shift of the light emitted from the lens assembly.

Embodiments described herein provide systems, devices, and methods for controlling an output of a light fixture. The light fixture includes a plurality of light sources. The light fixture is configured to produce an output that achieves a desired output color spectrum having different wavelengths of light. A controller performs an optical modification corresponding to a change in the desired output color spectrum. A relationship between the optical modification and the output color spectrum is then used to determine a color compensation value. The color compensation value is used to determine a control signal at which the light sources will be driven. As the optical modification is performed, the controller is configured to modify the control signal at which the light sources are driven based on the color compensation value.

According to some embodiments, a light fixture that produces an output includes an array of light-emitting diode ("LED") light sources, a driver circuit, and a controller. Each LED light source defines a color channel of the light fixture. The driver circuit drives the array of LED light sources. The controller includes a non-transitory computer readable medium and processing unit, the controller also including computer executable instructions stored in the non-transitory computer readable medium for controlling operation of the light fixture. Controlling operation of the light fixture includes receiving a first output color spectrum for the array of LED light sources that corresponds to a fixture color output spectrum (e.g., a CIE 1931 chromaticity diagram, an LAB color space, or any other representation of color range). Controlling operation of the light fixture also includes performing an optical modification of the fixture output color spectrum. Controlling operation of the light fixture also includes determining, based on the optical modification, a compensation value to modify the first output color spectrum to a second output color spectrum that compensates for changes to the fixture output color spectrum resulting from the optical modification. Controlling operation of the light fixture also includes generating, based on the compensation value, a first control signal to drive the array of LED light sources at the second output color spectrum. Controlling operation of the light fixture also includes controlling the driver circuit using the first control signal.

According to some embodiments, a system controls an output of a light fixture. The system includes the light fixture and a controller. The light fixture includes an array of light-emitting diode ("LED") light sources and a driver circuit. Each LED light source emits a color channel of the light fixture. The driver circuit drives the array of LED light sources. The controller generates a direct drive signal for one or more arrays of LED light sources. The controller includes a non-transitory computer readable medium and a processing unit, the controller including computer executable instructions stored in the non-transitory computer readable medium for controlling operation of the light fixture. Controlling operation of the light fixture includes receiving a first fixture output color spectrum emitted by the array of LED light sources. Controlling operation of the light fixture also includes performing an optical modification of the first fixture output color spectrum. Controlling operation of the light fixture also includes determining, based on the optical modification, a compensation value to compensate for changes to the first fixture output color spectrum, the changes to the first fixture output color spectrum resulting from the optical modification. Controlling operation of the light fixture also includes generating, based on the compensation value, a first control signal to drive the array of LED light sources to emit a second fixture output color spectrum. Controlling operation of the light fixture also includes controlling the driver circuit using the first control signal.

According to some embodiments, a method is used to control the light fixture. The method includes determining a first fixture output color spectrum for the light fixture, the light fixture having an array of LED light sources. The method also includes performing an optical modification of the fixture output color spectrum. The method also includes determining, based on the optical modification, a compensation value to compensate for changes to the fixture output color spectrum resulting from the optical modification. The method also includes generating, based on the compensation value, a first control signal to drive the array of LED light sources to emit a second fixture output color spectrum. The method also includes controlling the driver circuit using the first control signal.

According to some embodiments, a light fixture includes a lens, a first LED, a second LED, a driver circuit, and a controller. The first LED has a first LED output color spectrum. The second LED has a second LED output color spectrum, the first and second output color spectrums are mixed and passed through the lens to generate a fixture output color spectrum. The driver circuit drives the first and second LEDs. The controller includes a non-transitory computer readable medium and processing unit, the controller includes computer executable instructions stored in the non-transitory computer readable medium for controlling operation of the light fixture. Controlling operation of the light fixture includes receiving the fixture output color spectrum. Controlling operation of the light fixture also includes modifying the position of the lens relative to the first and second LEDs. Controlling operation of the light fixture also includes determining, based on the modification of the position of the lens, a value that compensates for changes in the fixture output color spectrum resulting from the modification of the position of the lens. Controlling operation of the light fixture also includes generating, based on the value, a control signal to drive the first LED at a third LED output color spectrum that is different from the first LED output color spectrum. Controlling operation of the light fixture also includes controlling the driver circuit using the first control signal.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Figure 1:
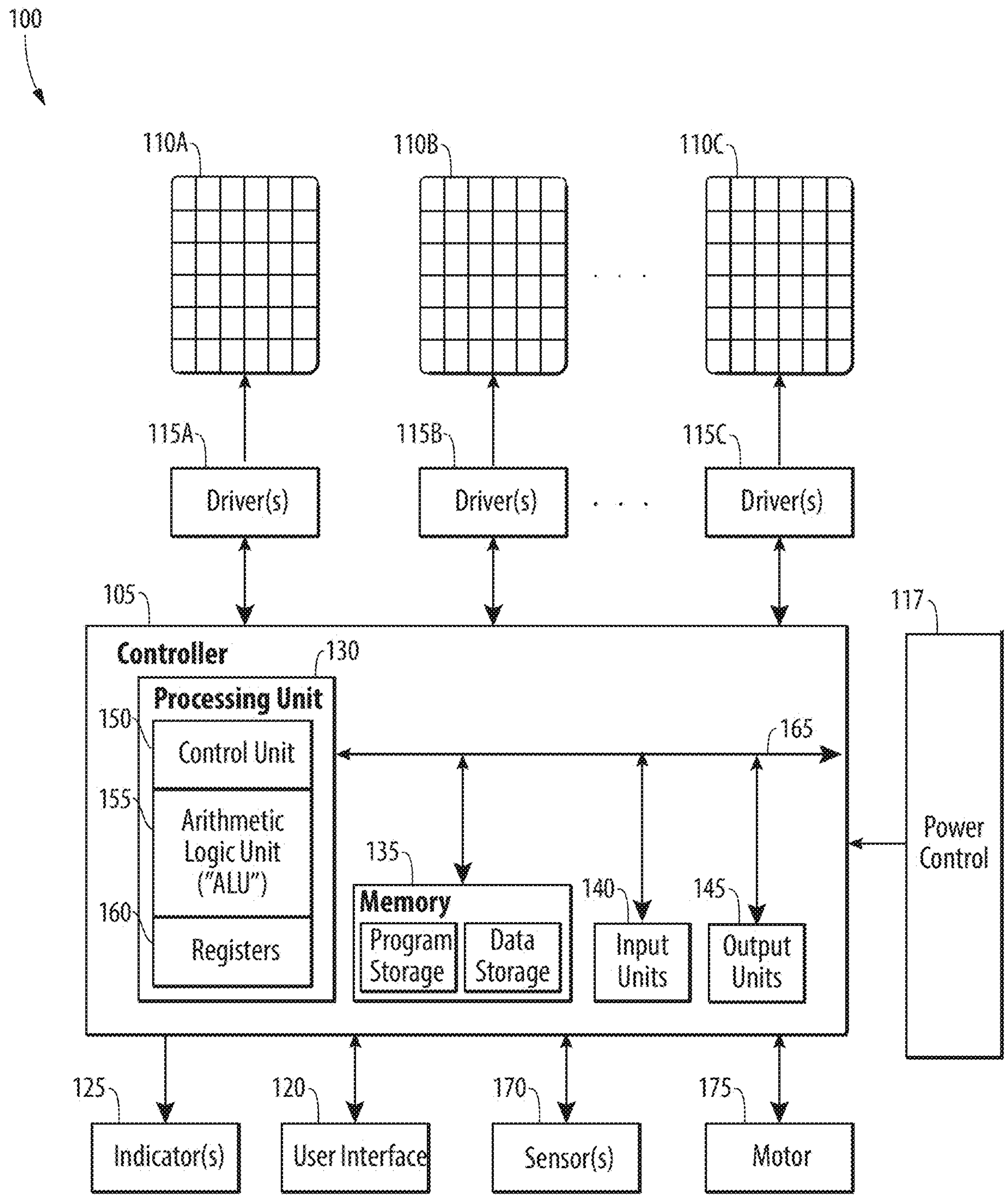
FIG. 1 is a block diagram of a light fixture, according to embodiments described herein.

In some embodiments, light fixtures are used in, for example, a theatre, a hall, an auditorium, a hotel, a cruise ship, or the like. As illustrated in FIG. 1, each light fixture 100 includes a controller 105, a plurality of light sources 110A-110C, a plurality of light source drivers or driver circuits 115A-115C, a power control circuit 117, a user interface 120, one or more indicators 125, one or more sensors 170, and a motor 175. In some embodiments, the light fixture 100 is separate from the controller 105. In other embodiments the controller 105 is contained in the light fixture 100 along with the light sources 110A-110C and the driver circuits 115A-115C.

The controller 105 includes a plurality of electrical and electronic components that provide power, operational control, and protection to the components and modules within the controller 105 and/or the fixture 100. For example, the controller 105 includes, among other things, a processing unit 130 (e.g., a microprocessor, a microcontroller, or another suitable programmable device), a memory 135, input units 140, and output units 145. The processing unit 130 includes, among other things, a control unit 150, an arithmetic logic unit ("ALU") 155, and a plurality of registers 160 (shown as a group of registers in FIG. 1), and is implemented using a known computer architecture (e.g., a modified Harvard architecture, a von Neumann architecture, etc.). The processing unit 130, the memory 135, the input units 140, and the output units 145, as well as the various modules connected to the controller 105 are connected by one or more control and/or data buses (e.g., common bus 165). The use of one or more control and/or data buses for the interconnection between and communication among the various modules and components would be known to a person skilled in the art in view of the invention described herein. The control and/or data buses are shown generally in FIG. 1 for illustrative purposes.

The memory 135 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 130 is connected to the memory 135 and executes software instructions that are capable of being stored in a RAM of the memory 135 (e.g., during execution), a ROM of the memory 135 (e.g., on a generally permanent basis), or another non-transitory computer readable medium such as another memory or a disc. Software included in the implementation of the light fixture 100 can be stored in the memory 135 of the controller 105. The software includes, for example, firmware, one or more applications, program data, filters, rules, one or more models (e.g., an output color spectrum, a spectral model, a CIE 1931 chromaticity diagram, or the like), one or more program modules, and other executable instructions. The controller 105 is configured to retrieve from the memory 135 and execute, among other things, instructions related to the control processes and methods described herein. In other embodiments, the controller 105 includes additional, fewer, or different components.

In some embodiments, the user interface 120 is included to receive a user input from a user. The user interface 120 is operably coupled to the controller 105 to provide an input signal indicative of the user input to the controller 105. The controller 105 receives the input signal from the user interface 120 to control, for example, the output of the light sources 110A-110C, and generate and provide control signals for the driver circuits 115A-115C based on the input signal. The user interface 120 can include any combination of digital and analog input devices required to receive the user input for the fixture 100. For example, the user interface 120 can include a computer having a display and input devices, a touch-screen display, a plurality of knobs, dials, switches, buttons, faders, or the like. In some embodiments, the user interface 120 is separated from the light fixture 100. In some embodiments, the controller 105 controls the light fixture 100 independently of the user interface 120.

The driver circuits 115A-115C include a first driver circuit 115A, a second driver circuit 115B, and a third driver circuit 115C, all of which are operable to drive (e.g., control) the light sources 110A-110C. The first driver circuit 115A is connected to a first array of light sources 110A and provides one or more drive signals to the first array of light sources 110A. The second driver circuit 115B is connected to a second array of light sources 110B and provides one or more drive signals to the second array of light sources 110B. The third driver circuit 115C is connected to a third array of light sources 110C and provides one or more drive signals to the third array of light sources 110C.

The power control circuit 117 supplies a nominal AC or DC voltage to the light fixture 100 or a system of light fixtures. In some embodiments, the power control circuit 117 is powered by one or more batteries or battery packs. In other embodiments, the power control circuit 117 is powered by mains power having nominal line voltages between, for example, 100V and 240V AC and frequencies of approximately 50-60 Hz. The power control circuit 117 is also configured to supply lower voltages to operate circuits and components within the light fixture 100.

As illustrated in FIG. 1, the controller 105 is connected to light sources 110A-110C. In some embodiments, each light source 110A-110C is a chip-on-board ("COB") light source. A three light source embodiment is illustrated for exemplary purposes only. In other embodiments, four or more light sources are used to further enhance the light fixture's ability to produce visible light. Conversely, in other implementations, fewer than three light sources are used (i.e., one or two light sources). The light sources 110A-110C are light emitting diode ("LED") arrays, although, in additional embodiments the light source may vary. The first array of light sources 110A defines, for example, a first color channel of the light fixture 100. The second array of light sources 110B defines, for example, a second color channel of the light fixture 100. The third array of light sources 110C defines, for example, a third color channel of the light fixture 100. In some embodiments, each array of light sources includes light sources that correspond to multiple color channels of the light fixture (e.g., both a first color channel and a second color channel of the light fixture 100). Each color channel of the light fixture 100 (e.g., the first color channel defined by the first array of light sources 110A, the second color channel defined by the second array of light sources 110B, the third color channel defined by the third array of light sources 110C, etc.) includes at least a first output color. In some embodiments, the first color channel of the first light source 110A includes the first output color, a second output color, and any greater number of output colors. For example, the first array of light sources 110A may include a first LED light source that emits the first output color and a second LED light source that emits the second output color. The first output color has a first LED output color spectrum and the second output color has a second LED output color spectrum. In some embodiments, the second LED output color spectrum is different than the first LED output color spectrum. In other embodiments, the second LED output color spectrum is the same as the first LED output color spectrum. Each light source of the plurality of light sources 110A-110C is configured to operate similarly to the first array of light sources 110A as described above. In some embodiments, a light source of the plurality of light sources 110A-110C may operate differently than described above. In combination, the first LED output color spectrum of the first array of light sources 110A, the second LED output color spectrum of the second array of light sources 110B, and further LED output color spectrums of the plurality of light sources 110A-110C produce a fixture color output spectrum of the light fixture 100. In other words, each individual LED output color spectrum is used in combination with further LED output color spectrums to produce the fixture output color spectrum that is emitted from the light fixture 100.

As illustrated in FIG. 1, the controller 105 is also connected to the one or more sensors 170 and the motor 175. In some embodiments, each sensor 170 is a position sensor that senses a position of the motor 175 and provides to the controller 105 one or more signals indicative of the position of the motor 175. For example, the sensors 170 may include a linear position sensor, a rotary position sensor, or an angular position sensor. The motor 175 drives the movement of various components of the light fixture 100 to perform any number of lighting operations. For example, the controller 105 may provide, based on the signals received from the one or more sensors 170, one or more control signals to the motor 175. The motor 175 drives, based on one or more control signals from the controller 105, the movement of various components of the light fixture 100 (e.g., a lens assembly, a belt drive assembly, or the like, further described in reference to FIG. 2 below). In some embodiments, the motor 175 is a direct-current ("DC") motor that receives power from the power control circuit 117. For example, the motor 175 may be a brushed DC motor, a brushless DC motor, a stepper motor, a servo motor, or the like. In some embodiments, it is not necessary to sense the position of the motor 175 using the one or more sensors 170. Instead, the controller 105 may receive one or more output signals indicative of the position of the motor 175 from the motor 175. The controller 105 determines, based on the one or more output signals from the motor 175, the position of the motor 175. For example, the motor 175 may drive the lens assembly to a final position of the belt drive assembly. At the final position of the belt drive assembly, the lens assembly cannot be driven any further and the controller 105 determines the position of the motor 175 based on the lens assembly stopping at the final position of the belt drive assembly.

Figure 2:
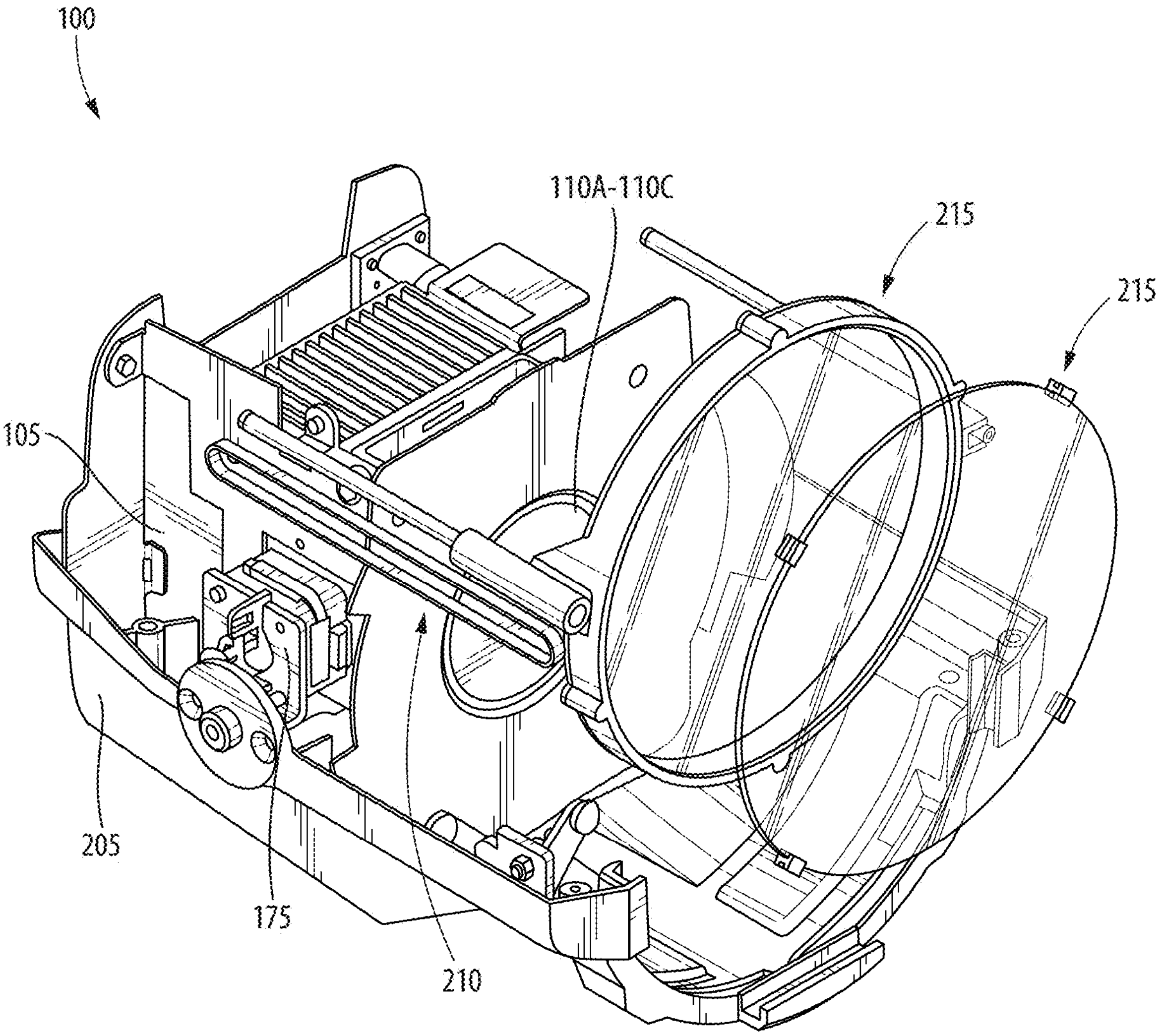
FIG. 2 is a perspective view of the light fixture of FIG. 1 with a portion of a housing removed.

FIG. 2 illustrates an example embodiment of the light fixture 100 in an assembly view. As illustrated in FIG. 2, the light fixture 100 includes the controller 105, the light sources 110A-110C, the motor 175, a housing 205, a belt drive assembly 210, and a lens assembly 215. For illustrative purposes, a portion of the housing 205 has been removed. In the illustrated embodiment, the components of the light fixture 100 are disposed at least partially within the housing 205. In some embodiments, some of the components of the light fixture 100 may be disposed outside of the housing 205. The motor 175 includes a motor shaft. The belt drive assembly 210 is connected to the motor shaft and the lens assembly 215 is connected to the motor shaft via the belt drive assembly 210. In response to a control signal from the controller 105, the motor 175 drives the belt drive assembly 210 to move the lens assembly 215 relative to the light sources 110A-110C. In some instances, the lens assembly 215 is driven away from the light sources 110A-110C. In other instances, the lens assembly 215 is driven towards the light sources 110A-110C. The lens may be driven linearly toward and away from the light sources 110A-110C. Because the motor shaft rotates to reposition the lens assembly 215, a rotational position of the motor shaft corresponds to a position of the lens assembly 215 relative to the light sources 110A-110C. The lens assembly 215 may perform an optical modification to alter the light emitted by the light sources 110A-110C as the emitted light passes through the lens assembly 215. In some embodiments, the lens assembly 215 may include one or more lenses, diffusers, filters, shutters, or other optical components to perform the optical modification. For example, the optical modification may be one or more of a zoom, a focus, a prismatic shift, a shutter operation, or the like. In some cases, numerous optical modifications can occur simultaneously. In some embodiments, the lens assembly includes two or more lenses that are moveable relative to one another.

Figure 3:
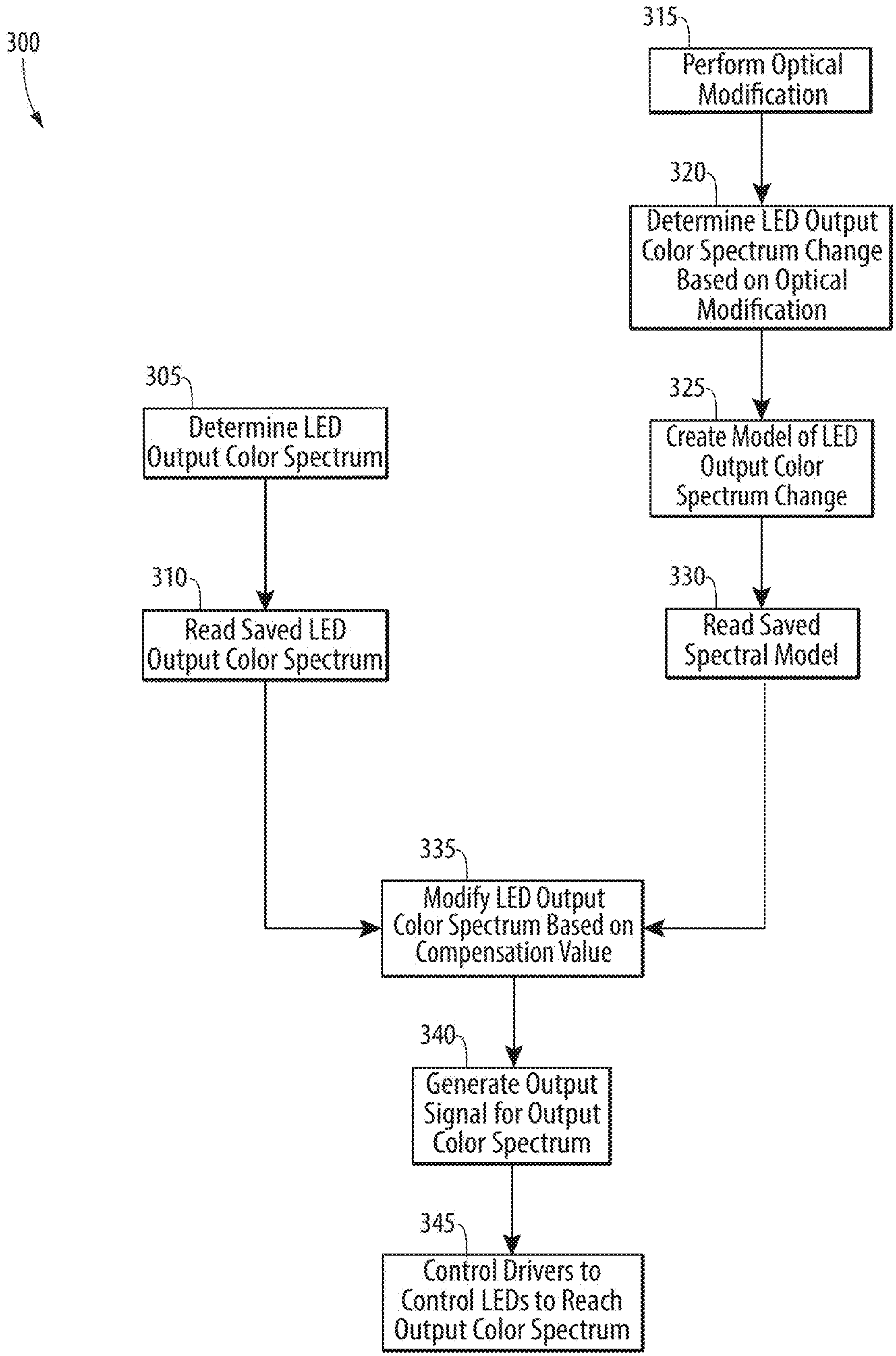
FIG. 3 illustrates a flow chart of a method for controlling an output of the light fixture of FIG. 1.

FIG. 3 illustrates a flow chart of a method 300 for controlling an output of the light fixture 100 to control color compensation of the fixture output color spectrum based on an optical modification. Various steps described herein with respect to the method 300 are capable of being executed simultaneously, in parallel, or in an order that differs from the illustrated serial manner of execution. Although the method 300 is described below in reference to a single array of light sources (e.g., the first array of light sources 110A), the method 300 is capable of being executed simultaneously for the plurality of light sources 110A-110C to achieve the fixture output color spectrum.

At step 305, the controller 105 determines a first LED output color spectrum of the first array of light sources 110A that corresponds to the fixture output color spectrum. In some embodiments, step 305 is performed prior to a runtime (e.g., prior to performing an operation) of the light fixture 100. In other embodiments, step 305 is performed during the runtime (e.g., while performing an operation) of the light fixture 100. The first LED output color spectrum is a combination of color outputs from the LED light sources of the first array of light sources 110A that create the fixture output color spectrum. Each color output may have a known value based on a voltage value, a current value, a duty cycle, or the like. The known value is obtained by the controller 105 to determine the color output within a portion of the first LED output color spectrum resulting from the way that each LED light source is driven. In some embodiments, the known value is stored in the memory 135 (e.g., a look-up table of known values). The controller 105 compares the first LED output color spectrum to the look-up table to determine the color output. In some embodiments, the controller 105 compares the color output to the look-up table to determine the first LED output color spectrum. Each LED light source is driven by a pulse-width modulated ("PWM") signal including a duty cycle that corresponds to the color output of each LED light source. For example, the controller 105 receives a position signal from the one or more sensors 170 indicative of the rotational position of the motor shaft. Based on the rotational position of the motor shaft, the controller 105 determines a first position of the lens assembly 215. The first position of the lens assembly 215 corresponds to the combination of color outputs representative of the fixture output color spectrum. The controller 105 determines the first output color spectrum based on the first position of the lens assembly 215.

At step 310, the controller 105 reads a saved LED output color spectrum from the memory 135. For example, the controller 105 compares the first LED output color spectrum with the saved LED output color spectrum within the memory 135 to determine whether the saved LED output color spectrum matches the first LED output color spectrum. Although step 315 is illustrated as a separate step from step 305 and step 310, in some embodiments, step 315 is performed concurrently with step 305 and step 310. In other embodiments, step 315 is performed in succession after the completion of step 310. At step 315, the controller 105 performs an optical modification of the fixture output color spectrum. For example, the controller 105 generates a motor command and sends the motor command to the motor 175 to drive the lens assembly 215 to a second position relative to the first array of light sources. The second position is different than the first position. In some embodiments, the optical modification corresponds to one or more of a zoom, a focus, a prismatic shift, a shutter operation, or the like of the light fixture 100. The fixture output color spectrum can change based on the optical modification. For example, a shift in the fixture output color spectrum can occur based on the optical modification. The shift may be caused by a relative proportion of the visual light emitters changing as a result of the optical modification or a visible shift in the output color of an individual LED light source as a result of the optical modification.

At step 320, the controller 105 determines the shift of the fixture output color spectrum (e.g., a change in the fixture output color spectrum from the first color output spectrum) based on the optical modification. In some embodiments, step 320 is performed prior to a runtime (e.g., prior to performing an operation) of the light fixture 100 and referenced after step 315. In other embodiments, step 320 is performed during the runtime (e.g., while performing an operation) of the light fixture 100. For example, the controller 105 determines a change in one or more wavelengths of the color outputs of the fixture output color spectrum. At step 325, the controller 105 creates a model of the change in the fixture output color spectrum based on the optical modification. In some embodiments, step 325 is performed prior to a runtime (e.g., prior to performing an operation) of the light fixture 100 and referenced after step 320. In other embodiments, step 305 is performed during the runtime (e.g., while performing an operation) of the light fixture 100. At step 330, the controller 105 reads a saved spectral model (e.g., the CIE 1931 chromaticity diagram or the like) from the memory 135. For example, the controller 105 determines the change in the fixture output color spectrum caused by the optical modification based on the motor 175 driving the lens assembly 215 to the second position. The controller 105 creates the model (e.g., a spectral model) of the fixture output color spectrum after the optical modification and compares the model to the saved spectral model to determine the change in the fixture output color spectrum from the first color output spectrum.

At step 335, the controller 105 modifies the fixture output color spectrum by determining a compensation value to achieve a second output color spectrum that compensates for the change in the fixture output color spectrum resulting from the optical modification. For example, after the optical modification the controller 105 determines the rotational position of the motor shaft that drives the lens assembly 215. Based on the rotational position after the optical modification, the controller 105 determines the position of the lens assembly 215. The controller 105 determines the compensation value to maintain the fixture output spectrum at or near the output prior to the optical modification occurring based on the position of the lens assembly 215 after the optical modification.

At step 340, the controller 105 generates, based on the compensation value, a first control signal to drive the first array of light sources 110A at the second output color spectrum that will result in maintaining the fixture output color spectrum. In some embodiments, the first control signal corresponds to the second position of the lens assembly 215. For example, the controller 105 determines a value for a PWM signal (e.g., a duty cycle that will be used to drive the first array of light sources 110A) to achieve the second output color spectrum. The first control signal may include a first command (e.g., a first PWM value) to drive the first LED light source of the first array of light sources 110A at the first output color. The first control signal may also include a second command (e.g., a second PWM value) to drive the second LED light source of the first array of light sources 110A at a third output color to achieve (combined with the first LED light source) the second output color spectrum. The third output color has a third LED output color spectrum and the third output color is different from the second output color.

At step 345, the controller 105 drives (e.g., controls) the first driver circuit 115A using the first control signal. For example, the controller 105 controls the first driver circuit 115A to (i) drive the first LED light source of the first array of light sources 110A using the first command, and (ii) drive the second LED light source of the first array of light sources 110A using the second command, where (i) and (ii) combine to achieve the second color output spectrum. In some embodiments, in response to the first control signal, the fixture output color spectrum is substantially the same before and after the optical modification.

Figure 4:
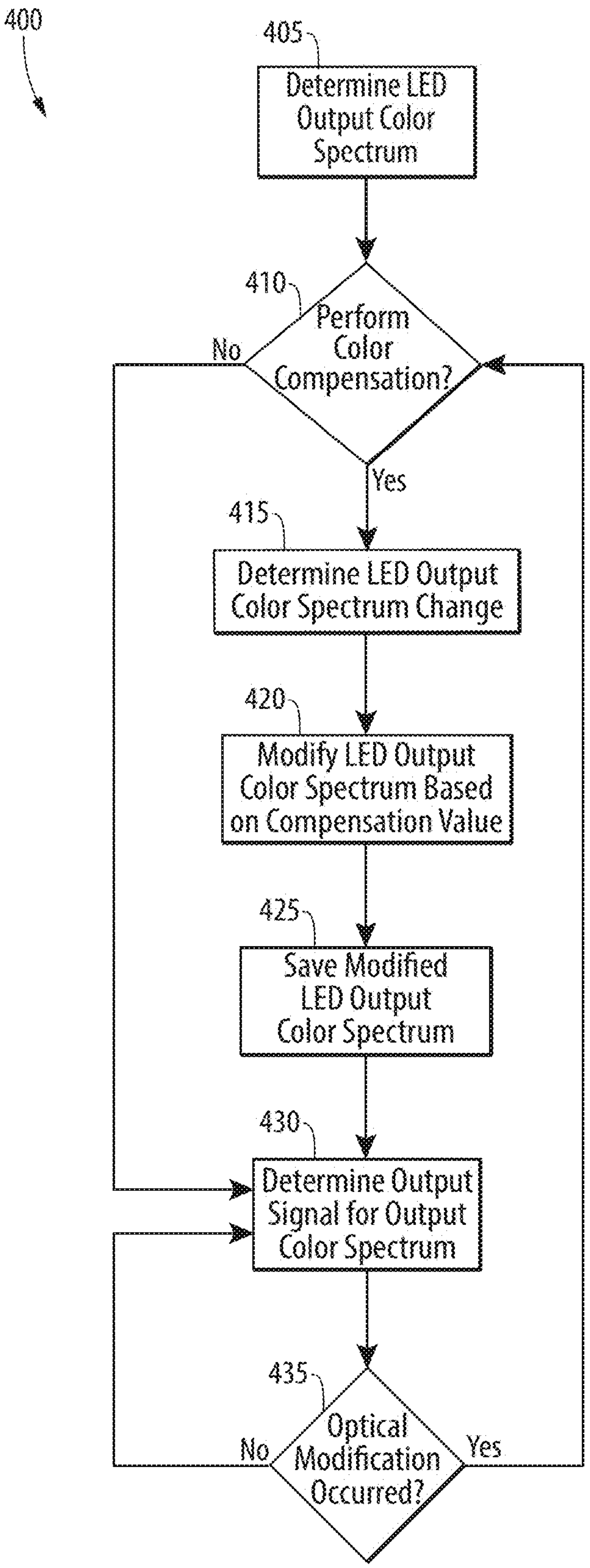
FIG. 4 illustrates a flow chart of a method for controlling an output of the light fixture of FIG. 1.

FIG. 4 illustrates a flow chart of a method 400 for controlling an output of the light fixture 100 to control color compensation of the fixture output color spectrum based on an optical modification. The method of FIG. 4 is combinable with the methods disclosed in the other figures. Various steps described herein with respect to the method 400 are capable of being executed simultaneously, in parallel, or in an order that differs from the illustrated serial manner of execution. Although the method 400 is described below in reference to a single array of light sources (e.g., the first array of light sources 110A), the method 400 is capable of being executed simultaneously for the plurality of light sources 110A-110C to achieve the fixture output color spectrum.

At step 405, the controller 105 determines a first LED output color spectrum of the first array of light sources 110A that corresponds to the fixture output color spectrum. For example, the controller 105 receives a position signal from the one or more sensors 170 indicative of the rotational position of the motor shaft. Based on the rotational position of the motor shaft, the controller 105 determines a first position of the lens assembly 215. The first position of the lens assembly 215 corresponds to the combination of color outputs representative of the fixture output color spectrum. The controller 105 determines the fixture output color spectrum based on the first position of the lens assembly 215.

At step 410, the controller 105 determines whether to perform a color compensation operation. For example, the controller 105 determines whether an optical modification has occurred. When the controller determines that an optical modification has not occurred, the method 400 proceeds to step 430. At step 430, the controller 105 determines a first control signal (e.g., an output signal) to drive the first array of light sources 110A at the first output color spectrum via the first driver circuit 115A. For example, the controller 105 determines the first output signal to maintain or substantially maintain the fixture output color spectrum and drives (e.g., controls) the first driver circuit 115A using the first control signal. At step 435, the controller 105 determines whether an optical modification has occurred. If the controller 105 determines that an optical modification has not occurred, the method 400 returns to step 430 and the first driver circuit 115A continues to drive the first array of light sources 110A at the first control signal. If the controller 105 determines that an optical modification has occurred, the method 400 returns to step 410 to determine whether to perform the color compensation operation based on the optical modification. If the controller 105 determines that the color compensation operation should be performed based on the optical modification, the method 400 proceeds to step 415.

At step 415, the controller 105 determines the shift of the fixture output color spectrum (e.g., the change in the fixture output color spectrum from the first color output spectrum) based on the optical modification. For example, the controller 105 determines a change in one or more wavelengths of the color outputs of the fixture output color spectrum. The controller 105 creates a model of the change in the fixture output color spectrum based on the optical modification and reads a saved spectral model (e.g., the CIE 1931 chromaticity diagram or the like) from the memory 135. For example, the controller 105 determines the change in the fixture output color spectrum caused by the optical modification based on the motor 175 driving the lens assembly 215 to the second position. The controller 105 creates the model (e.g., a spectral model) of the fixture output color spectrum after the optical modification occurs and compares the model to the saved spectral model to determine the change in the fixture output color spectrum.

At step 420, the controller 105 modifies the fixture output color spectrum with a compensation value to achieve a second output color spectrum that compensates for the change in the fixture output color spectrum resulting from the optical modification. The compensation value may be the determined change in the one or more wavelengths of the fixture output color spectrum after the optical modification. For example, the controller 105 determines the rotational position of the motor shaft after the optical modification. Based on the rotational position after the optical modification, the controller 105 determines the position of the lens assembly 215. The controller 105 determines the compensation value to maintain or substantially maintain the fixture output spectrum based on the position of the lens assembly 215 after the optical modification.

At step 425, the controller 105 saves the modified fixture output color spectrum (e.g., the second output color spectrum) to the memory 135. At step 430, the controller 105 determines, based on the compensation value, a first control signal to drive the first array of light sources 110A at the second output color spectrum. In some embodiments, the first control signal corresponds to the second position of the lens assembly 215. For example, the controller 105 generates a value for a PWM signal (e.g., a duty cycle that will be used to drive the first array of light sources 110A) to achieve the second output color spectrum. The first control signal may include a first command (e.g., a first PWM value) to drive the first LED light source of the first array of light sources 110A at the first output color. The first control signal may also include a second command (e.g., a second PWM value) to drive the second LED light source of the first array of light sources 110A at a third output color to (combined with the first output color from the first LED light source) achieve the second output color spectrum. The third output color has a third LED output color spectrum and the third output color is different from the second output color.

The controller 105 drives (e.g., controls) the first driver circuit 115A using the first control signal. For example, to achieve the second color output spectrum, the controller 105 controls the first driver circuit 115A to drive the first LED light source of the first array of light sources 110A using the first command and drive the second LED light source of the first array of light sources 110A using the second command. In some embodiments, in response to the first control signal, the fixture output color spectrum (e.g., the second output color spectrum) is substantially the same before and after the optical modification.

At step 435, the controller 105 determines whether an optical modification has occurred. When the controller 105 determines that an optical modification has not occurred, the method 400 returns to step 430 and the first driver circuit 115A continues to drive the first array of light sources 110A at the first control signal. When the controller 105 determines that an optical modification has occurred, the method 400 returns to step 410 to determine whether to perform the color compensation operation based on the optical modification. When the controller 105 determines that the color compensation operation should be performed based on the optical modification, the method 400 returns to step 415.

While embodiments disclosed herein primarily refer to controlling color compensation of a single LED light source of the first array of LED light sources 110A based on the optical modification, additional LED light sources may be color compensated in response to the optical modification. For example, the light fixture 100 may include the lens assembly 215 (further including a lens), the first LED light source (e.g., a first LED) having the first output color spectrum, the second LED light source (e.g., a second LED) having a second output color spectrum, the first driver circuit 115A, and the controller 105. In some embodiments, the first output color spectrum and the second output color spectrum are mixed and passed through the lens to generate the fixture output color spectrum.

The controller 105 receives a position signal from the one or more sensors 170 indicative of the rotational position of the motor shaft. Based on the rotational position of the motor shaft, the controller 105 determines a first position of the lens. The controller 105 determines the fixture output color spectrum based on the first position of the lens. The controller 105 may modify the first position of the lens relative to the first LED and the second LED to achieve a second position of the lens (e.g., an optical modification). The controller 105 determines a value (e.g., a compensation value) that compensates for changes in the fixture output color spectrum based on the modification of the position of the lens to the second position. Based on the determined compensation value, the controller 105 generates a control signal to drive the first LED at a third LED output color spectrum that is different from the first LED output color spectrum. The controller 105 drives (e.g., controls) the first driver circuit 115A using the first control signal.

In some embodiments, the controller 105 determines the compensation value so that the fixture output color spectrum remains substantially unchanged before and after the modification of the position of the lens relative to the first and second LEDs. In some embodiments, the controller 105 generates, based on the compensation value, a second control signal to drive the second LED at a fourth LED output color spectrum that is different from the second LED output color spectrum. The controller 105 drives the first driver circuit 115A using the second control signal.

In some embodiments, the controller 105 includes the third LED light source (e.g., a third LED) having a fifth output color spectrum. In some embodiments, the first output color spectrum, the second output color spectrum, and the fifth output color spectrum are mixed and passed through the lens to generate the fixture output color spectrum. The controller 105 generates, based on the compensation value, a third control signal to drive the third LED at a sixth LED output color spectrum that is different from the fifth LED output color spectrum. The controller 105 drives the first driver circuit 115A using the third control signal. In some embodiments, the first output color spectrum, the second output color spectrum, and the fifth output color spectrum are different.

Figure 5:
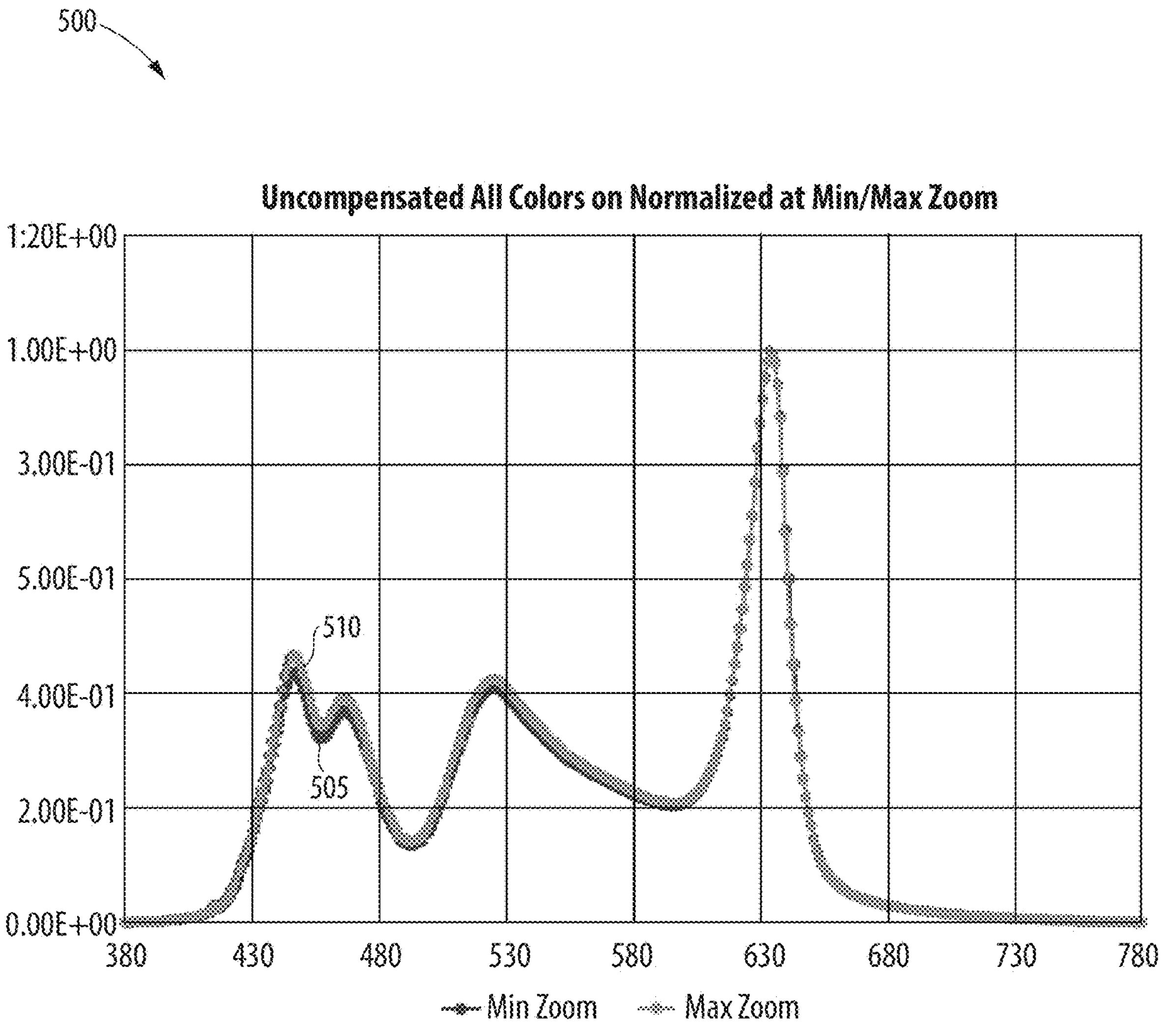
FIG. 5 is a graph of a fixture output color spectrum of the light fixture of FIG. 1 based an optical modification.

FIG. 5 illustrates a graph 500 of the fixture output color spectrum of the light fixture 100 based on an optical modification. In the illustrated embodiment, the fixture output color spectrum includes a plurality of LED output color spectrums. Each LED output color spectrum of the plurality of LED output color spectrums corresponds to a respective wavelength (e.g., wavelengths within the visible light spectrum) and includes a relative intensity of the respective LED output color spectrum. The wavelength of each LED output color spectrum corresponds to a color output for each respective LED output color spectrum. The relative intensity is normalized to a peak that occurs at exactly “1” (e.g., a 100% intensity). The relative intensity of each wavelength is illustrated as its relationship to the peak. For example, if a wavelength is half as bright as the brightest wavelength, then the relative intensity of the given wavelength would be displayed as “0.5” (e.g., a 50% intensity). Line 505 depicts the fixture output color spectrum prior to the optical modification. For example, the line 505 depicts the light fixture 100 with the lens assembly 215 in the first position. Line 510 depicts the fixture output color spectrum after the optical modification. For example, the line 510 depicts the light fixture 100 with the lens assembly 215 in the second position. As illustrated by FIG. 5, the fixture output color spectrum experiences a change in relative intensity after the optical modification, especially in the wavelength range between 430 nm and 480 nm. FIGS. 6A-7B, which are discussed in more detail below, illustrate how the outputs of the individual LED light sources are driven to compensate for the change in the fixture output color illustrated in FIG. 5.

Figure 6A:
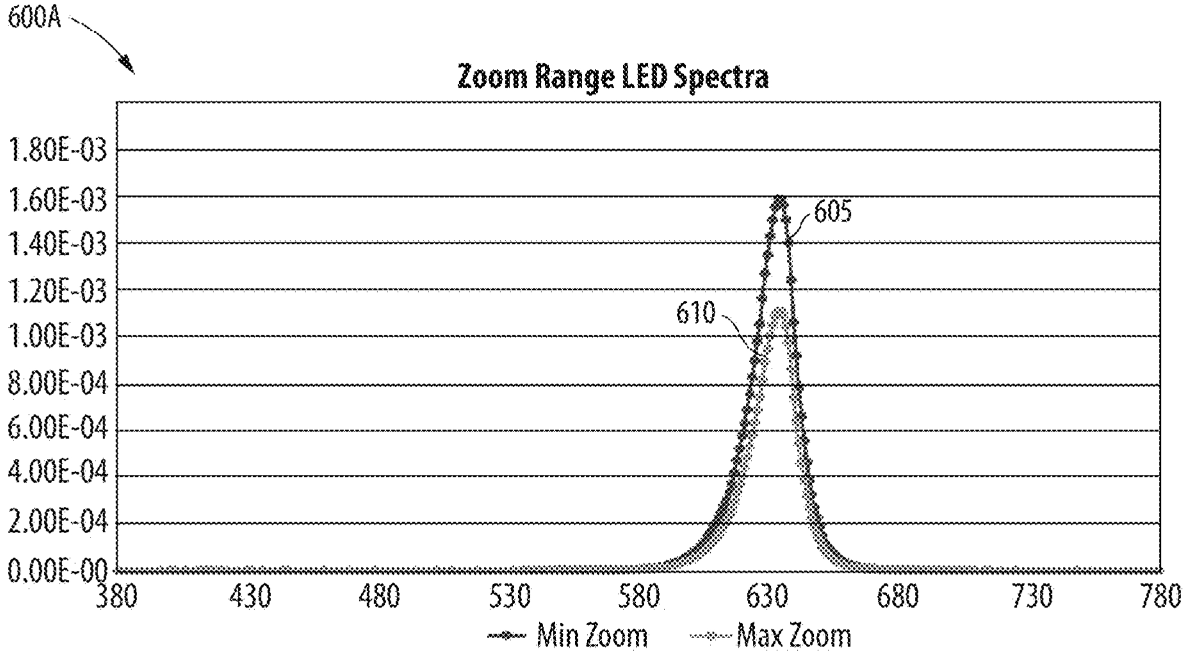
FIG. 6A is a graph of a first LED output color spectrum of the light fixture of FIG. 1 based on an optical modification.

FIG. 6A illustrates a graph 600A of the first LED output color spectrum of the first LED light source based on an optical modification. The first LED output color spectrum of the first LED light source corresponds to a first wavelength and includes a relative intensity of the first LED output color spectrum. The first wavelength of the first LED output color spectrum corresponds to the first color output. Line 605 depicts the first LED output color spectrum prior to the optical modification. For example, the line 605 depicts the output of the first LED from the light fixture 100 with the lens assembly 215 in the first position. Line 610 depicts the first LED output color spectrum after the optical modification. For example, the line 610 depicts the output of the first LED from the light fixture 100 with the lens assembly 215 in the second position. As shown by FIG. 6A, the first LED output color spectrum experiences a change in relative intensity after the optical modification. In the illustrated embodiment, the relative intensity of the first LED output color spectrum decreases from line 605 to line 610.

Figure 6B:
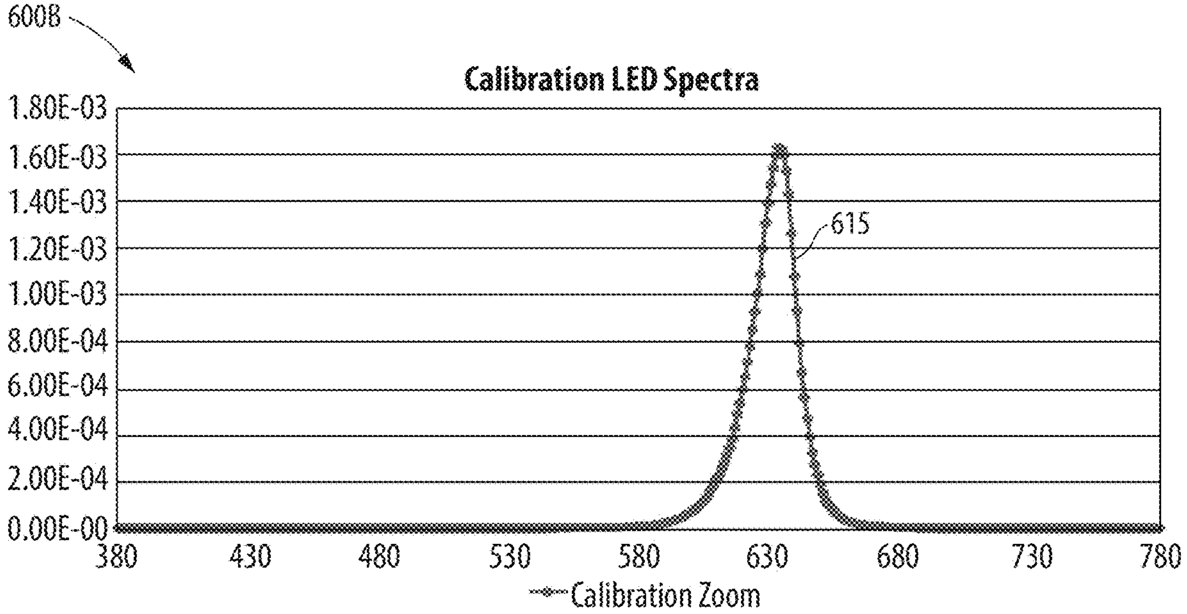
FIG. 6B is a graph of the calibrated first LED output color spectrum after the optical modification of FIG. 6A.

FIG. 6B illustrates a graph 600B of a calibrated first LED output color spectrum of the first LED light source after controlling an output of the light fixture 100 to control color compensation. Line 615 depicts the first LED output color spectrum. Line 615 is a plurality of measurements of relative intensities at a known point (e.g., relative intensities based on the first wavelength) that the controller 105 uses to determine a difference from the modeled first LED color spectrum. In effect, this is the target value for the line 610 (i.e., the target for the LED output after the optical modification has occurred). In the illustrated embodiment, the relative intensity of line 615 is substantially the same as the relative intensity of the line 605 of FIG. 6A. Thus, the first output color spectrum must be compensated to account for the change in the first color output resulting from the optical modification (i.e., the difference between lines 610 and 615).

Figure 7A:
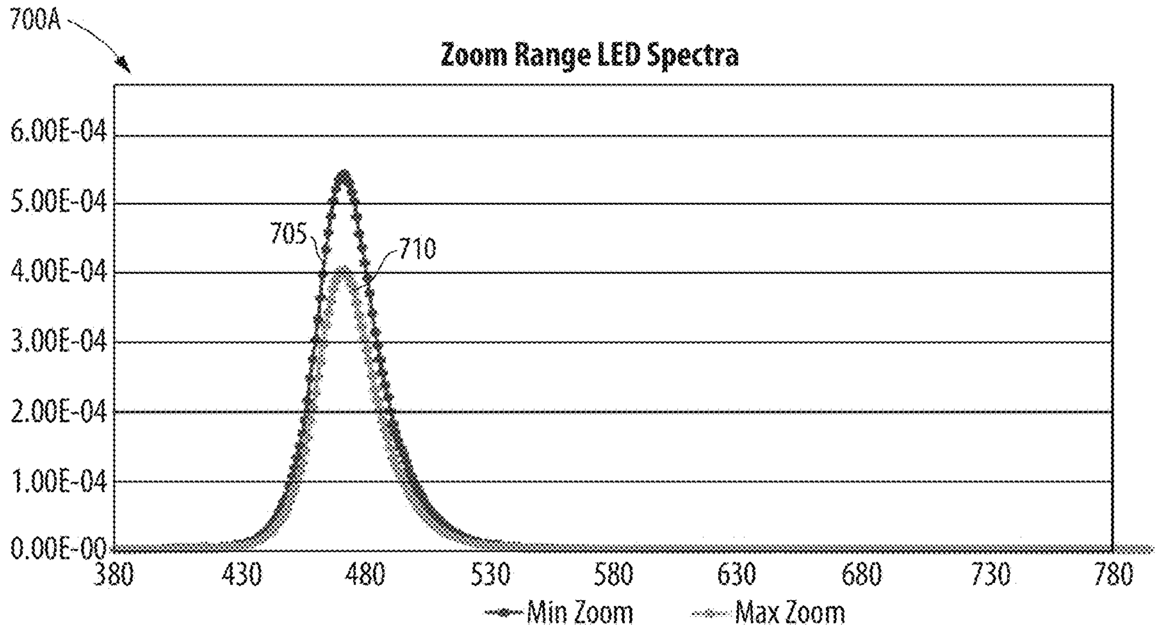
FIG. 7A is a graph of a second LED output color spectrum of the light fixture of FIG. 1 based on an optical modification.

FIG. 7A illustrates a graph 700A of the second LED output color spectrum of the second LED light source based on an optical modification. The second LED output color spectrum of the second LED light source corresponds to a second wavelength and includes a relative intensity of the second LED output color spectrum. The second wavelength of the second LED output color spectrum corresponds to the second color output. In the illustrated embodiment, the second wavelength is different than the first wavelength of FIG. 6A. Line 705 depicts the second LED output color spectrum prior to the optical modification. For example, the line 705 depicts the output of the second LED from the light fixture 100 with the lens assembly 215 in the first position. Line 710 depicts the second LED output color spectrum after the optical modification. For example, the line 710 depicts the output of the second LED from the light fixture 100 with the lens assembly 215 in the second position. As shown by FIG. 7A, the second LED output color spectrum experiences a change in relative intensity after the optical modification. In the illustrated embodiment, the relative intensity of the second LED output color spectrum decreases from line 705 to line 710.

Figure 7B:
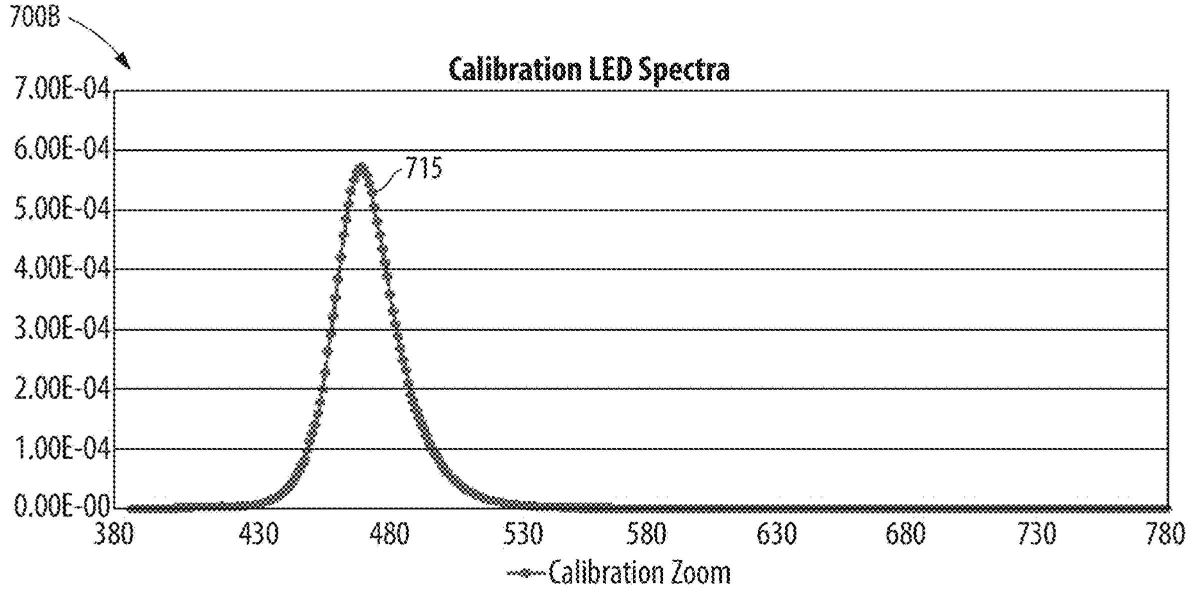
FIG. 7B is a graph of the calibrated second LED output color spectrum after the optical modification of FIG. 7A.

FIG. 7B illustrates a graph 700B of a calibrated second LED output color spectrum of the second LED light source after controlling an output of the light fixture 100 to control color compensation. Line 715 depicts the second LED output color spectrum. Line 715 is a plurality of measurements of relative intensities at a known point (e.g., relative intensities based on the second wavelength) that the controller 105 uses to determine a difference from the modeled second LED color spectrum. Similar to line 615, above, this is the target value for the line 710 (i.e., the target for the LED output after the optical modification has occurred). In the illustrated embodiment, the relative intensity of line 715 is substantially the same as the relative intensity of the line 705 of FIG. 7A. Due to the differences between line 710 and 715, the output of the second LED must be compensated so that the second LED color spectrum after modification (represented by line 710) must be modified to match the target second LED output color spectrum (represented by calibration line 715). When the compensated outputs illustrated in FIGS. 6A-7B are combined to result in the compensated fixture output color, the individual LED light sources are thus driven to compensate for the change in the fixture output color illustrated in FIG. 5.

Thus, embodiments described herein provide, among other things, systems, devices, and methods for controlling an output of a light fixture to control the color compensation of a plurality of light sources based on an optical modification.

What is claimed is:

1. A light fixture, comprising:

an array of light-emitting diode (LED) light sources, each LED light source defining a color channel of the light fixture;

a driver circuit that drives the array of LED light sources;

a lens;

a motor having a motor shaft connected to the lens such that each rotational position of the motor shaft corresponds to a different respective position of the lens relative to the array of LED light sources; and a controller including a non-transitory computer readable medium and processing unit, the controller including computer executable instructions stored in the non-transitory computer readable medium for controlling operation of the light fixture to:

determine a first output color spectrum for the array of LED light sources that corresponds to a first rotational position of the motor shaft, perform an optical modification by controlling the motor to rotate the motor shaft from the first rotational position to a second rotational position, determine, based on the first and second rotational positions, a color compensation value to modify the first output color spectrum to a second output color spectrum that compensates for a spectral change to light emitted by the light fixture due to the optical modification, generate, based on the color compensation value, a first control signal to drive the array of LED light sources at the second output color spectrum, and control the driver circuit using the first control signal.

2. The light fixture of claim 1, wherein the color channels of the light fixture include a first output color and a second output color, and wherein the array of LED light sources comprises:

a first LED light source emitting the first output color, the first output color having a first color spectrum; and a second LED light source emitting the second output color, the second output color having a second color spectrum, wherein the second color spectrum is different from the first color spectrum.

3. The light fixture of claim 2, wherein the first control signal includes a first command to drive the first LED light source at the first output color, and wherein the first control signal includes a second command to drive the second LED light source at a third output color, the third output color having a third color spectrum, wherein the third output color is different from the second output color.

4. The light fixture of claim 1, wherein the optical modification is at least one selected from the group consisting of a zoom, a focus, a prismatic shift, and a shutter operation.

5. The light fixture of claim 1, wherein the controller further controls operation of the light fixture to:

determine the second rotational position of the motor shaft after the optical modification;

determine, based on the second rotational position, a position of the lens relative to the array of LED light sources after the optical modification; and determine, based on the position of the lens, the color compensation value.

6. The light fixture of claim 5, wherein the first control signal corresponds to the position of the lens.

7. The light fixture of claim 1, wherein a spectrum of the light emitted by the light fixture, as a result of the first control signal, is substantially the same before and after the optical modification.

8. A system for controlling a light fixture, the system comprising:

the light fixture including:

an array of light-emitting diode (LED) light sources, each LED light source defining a color channel of the light fixture, a driver circuit for driving the array of LED light sources, a lens, a motor having a motor shaft connected to the lens such that each rotational position of the motor shaft corresponds to a different respective position of the lens relative to the array of LED light sources; and a controller configured to generate a direct drive signal for one or more arrays of LED light sources, the controller including a non-transitory computer readable medium and a processing unit, the controller including computer executable instructions stored in the non-transitory computer readable medium for controlling operation of the light fixture to:

determine a first output color spectrum emitted by the array of LED light sources that corresponds to a first rotational position of the motor shaft, perform an optical modification by controlling the motor to rotate the motor shaft from the first rotational position to a second rotational position, determine, based on the first and second rotational positions, a color compensation value to compensate for a spectral change to the first output color spectrum due to the optical modification, generate, based on the color compensation value, a first control signal to drive the array of LED light sources to emit a second output color spectrum, and control the driver circuit using the first control signal.

9. The light fixture of claim 8, wherein the array of LED light sources comprises:

a first LED light source emitting a first output color, the first output color having a first color spectrum; and a second LED light source emitting a second output color, the second output color having a second color spectrum, wherein the second color spectrum is different from the first color spectrum.

10. The light fixture of claim 9, wherein the first control signal includes a first command to drive the first LED light source at the first output color, and wherein the first control signal includes a second command to drive the second LED light source at a third output color, the third output color having a third color spectrum, wherein the third output color is different from the second output color.

11. The light fixture of claim 8, wherein the optical modification is at least one selected from the group consisting of a zoom, a focus, a prismatic shift, and a shutter operation.

12. The light fixture of claim 8, wherein the controller further controls operation of the light fixture to:

determine the second rotational position of the motor shaft during the optical modification;

determine, based on the second rotational position, a position of the lens relative to the array of LED light sources during the optical modification; and determine, based on the position of the lens, the color compensation value.

13. The light fixture of claim 12, wherein the first control signal corresponds to the position of the lens.

14. A method of controlling a light fixture, the method comprising:

determining a first fixture output color spectrum for the light fixture, the light fixture having an array of LED light sources that are driven to emit first fixture output color spectrum, performing an optical modification of the fixture output color spectrum, determining, based on the optical modification, a compensation value to compensate for changes to the fixture output color spectrum resulting from the optical modification, generating, based on the compensation value, a first control signal to drive the array of LED light sources to emit a second fixture output color spectrum, and controlling the driver circuit using the first control signal, wherein the light fixture includes a lens, wherein the method further comprises:

determining a rotational position of a motor shaft that corresponds to a position of the lens during the optical modification;

determining, based on the rotational position, the position of the lens during the optical modification; and determining, based on the position of the lens, the compensation value.

15. The method of claim 14, wherein the first control signal includes a first command to drive a first LED light source of the array of LED light sources at the first output color, wherein the first control signal includes a second command to drive a second LED light source of the array of LED light sources at a second output color, and wherein the second output color is different than the first output color.

16. The method of claim 14, wherein the optical modification is at least one selected from the group consisting of a zoom, a focus, a prismatic shift, and a shutter operation.

17. The method of claim 14, wherein the first control signal corresponds to the position of the lens.

18. A light fixture comprising:

a lens, a first LED emitting first light with a first LED output color spectrum, a second LED emitting second light with a second LED output color spectrum, wherein the first and second emitted lights are mixed and passed through the lens to generate output light with a fixture output color spectrum, a motor configured to move the lens relative to the first and second LEDs, a driver circuit for driving the first and second LEDs, and a controller including a non-transitory computer readable medium and processing unit, the controller including computer executable instructions stored in the non-transitory computer readable medium for controlling operation of the light fixture to:

determine the fixture output color spectrum corresponding to a first position of the lens relative to the first and second LEDs, operate the motor to move the lens from the first position to a second position relative to the first and second LEDs, determine, based on the first and second positions of the lens, a color compensation value that compensates for a spectral change in the output light resulting from the move modification, generate, based on the color compensation value, a first control signal to drive the first LED to cause the first light to have a third LED output color spectrum that is different from the first LED output color spectrum, and control the driver circuit using the first control signal.

19. The light fixture of claim 18, wherein the color compensation value is determined such that the fixture output color spectrum remains substantially unchanged before and after the move.

20. The light fixture of claim 19, wherein the controller further controls operation of the light fixture to generate, based on the color compensation value, a second control signal to drive the second LED to cause the second light to have a fourth LED output color spectrum that is different from the second LED output color spectrum.

21. The light fixture of claim 20, further comprising a third LED emitting third light with a fifth output color spectrum, wherein the first, second, and third lights are mixed and passed through the lens to generate the fixture output color spectrum, and wherein the controller further controls operation of the light fixture to generate, based on the color compensation value, a third control signal to drive the third LED to cause the third light to have at a sixth LED output color spectrum that is different from the fifth LED output color spectrum.

22. The light fixture of claim 21, wherein the first, second, and fifth LED output color spectrums differ from one another.

* * * * *